No. 798,792. PATENTED SEPT. 5, 1905.
E. A. HIRNER.
CIRCULAR KNITTING MACHINE.
APPLICATION FILED JULY 22, 1903.
8 SHEETS—SHEET 1.
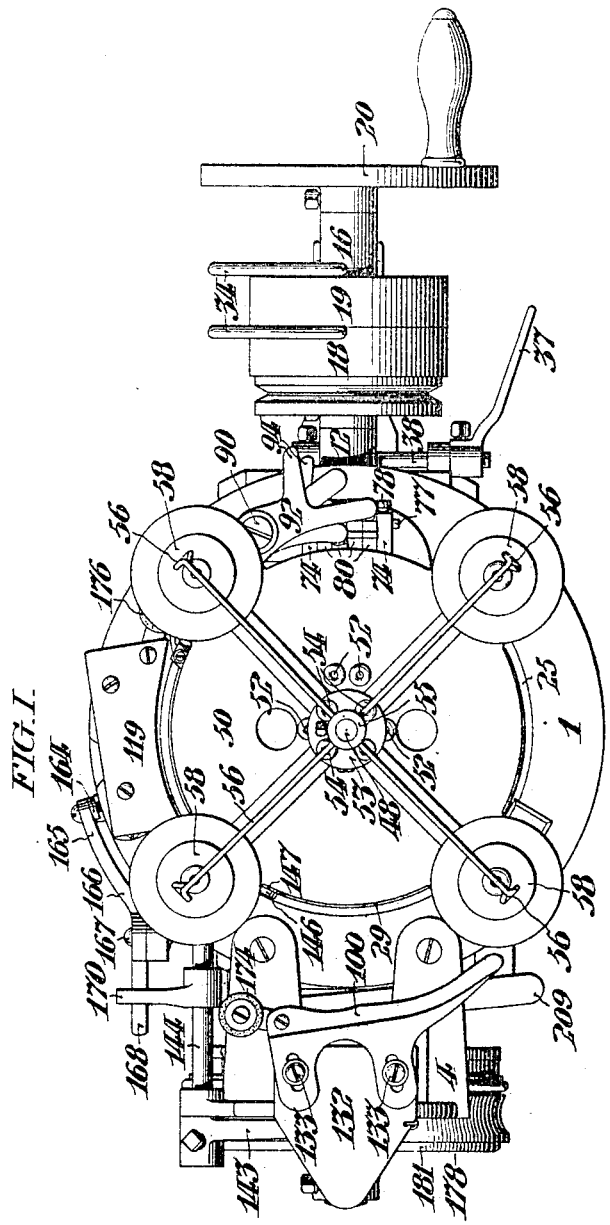
FIG. I.
WITNESSES:
INVENTOR:

No. 798,792. PATENTED SEPT. 5, 1905.
E. A. HIRNER.
CIRCULAR KNITTING MACHINE.
APPLICATION FILED JULY 22, 1903.
8 SHEETS—SHEET 2.
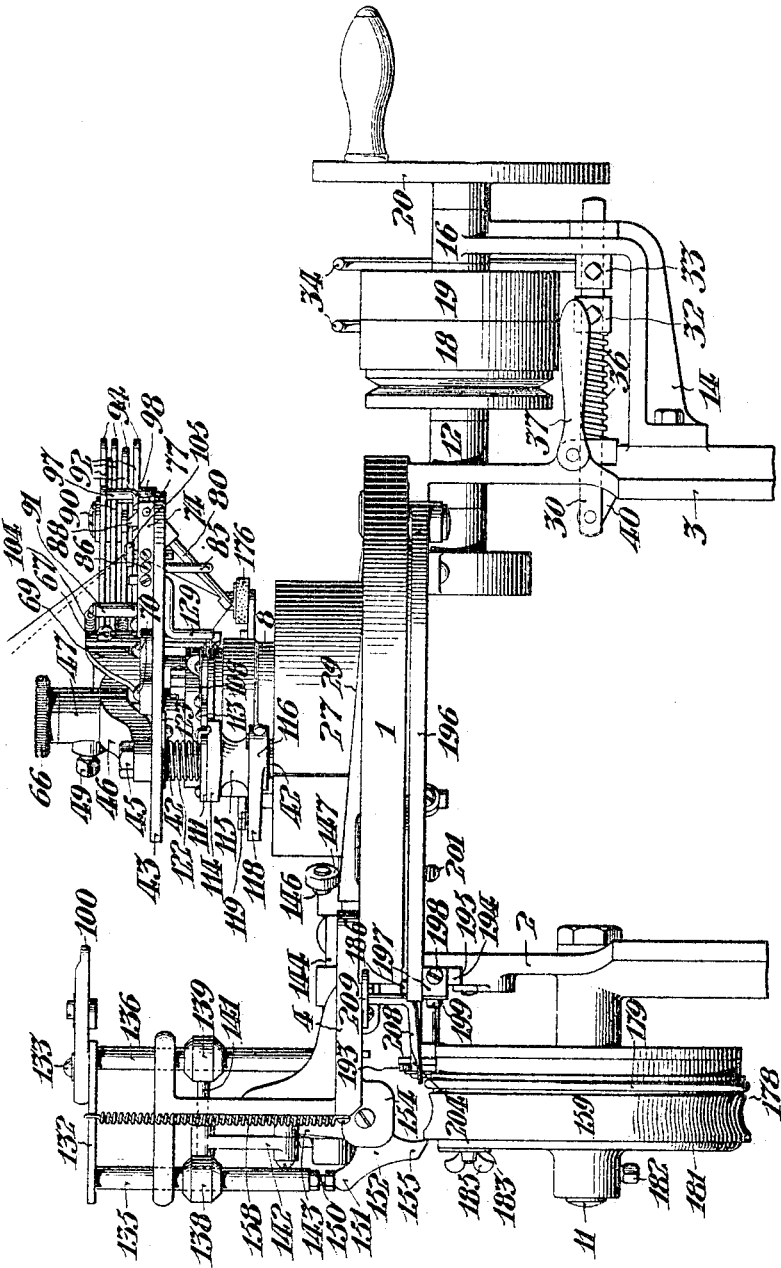
WITNESSES:
INVENTOR:

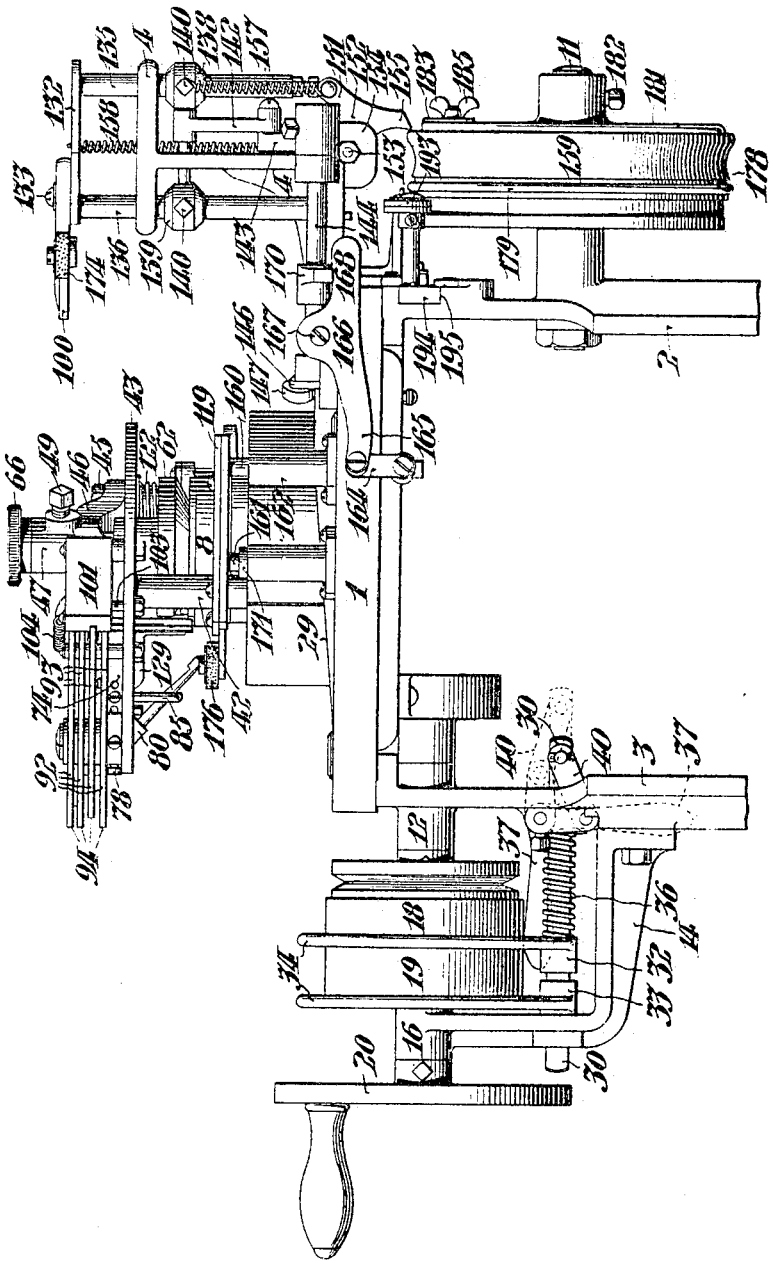

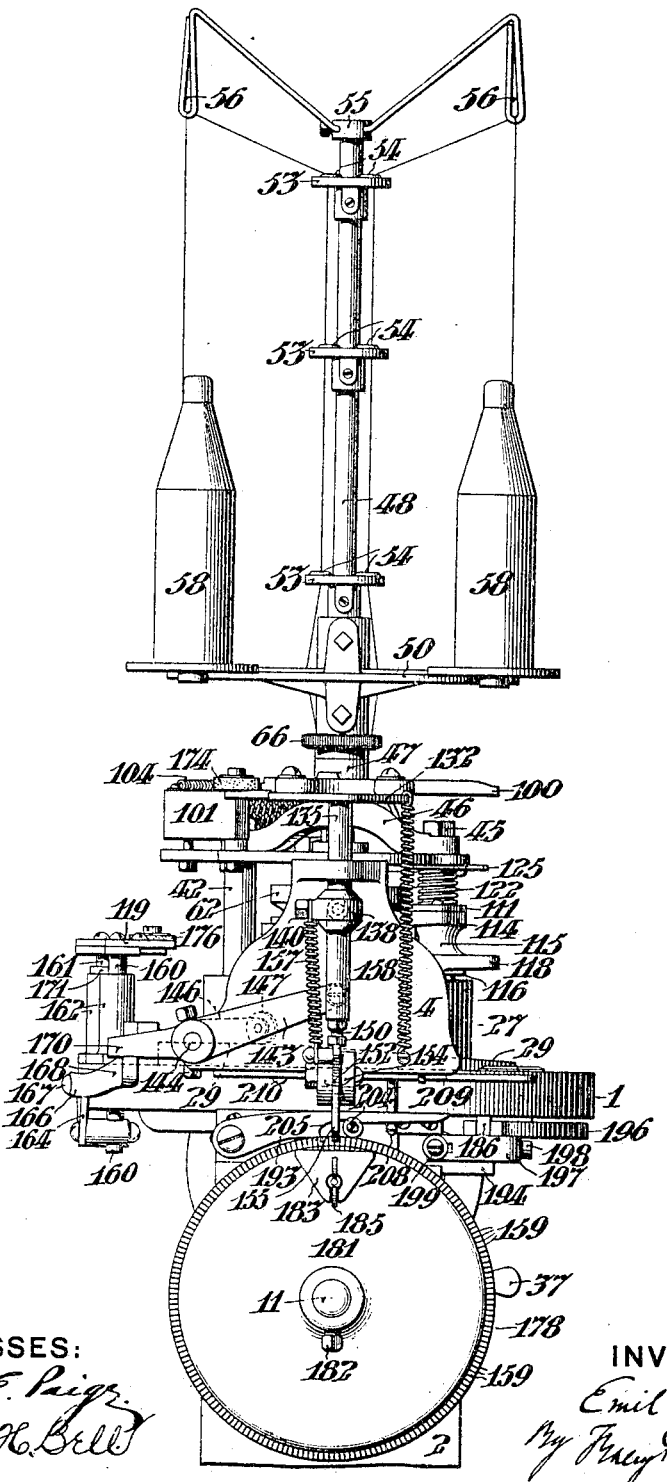

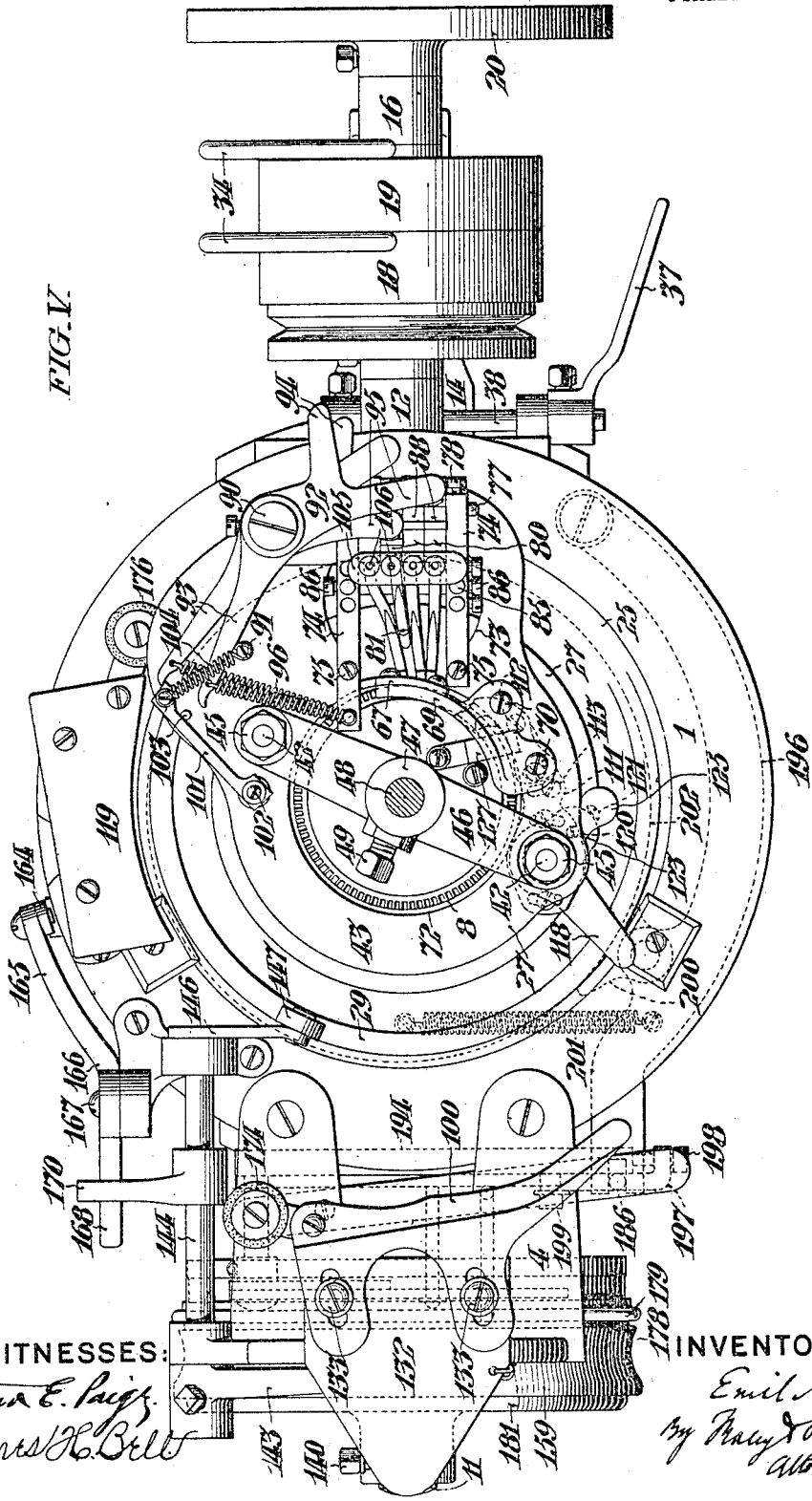

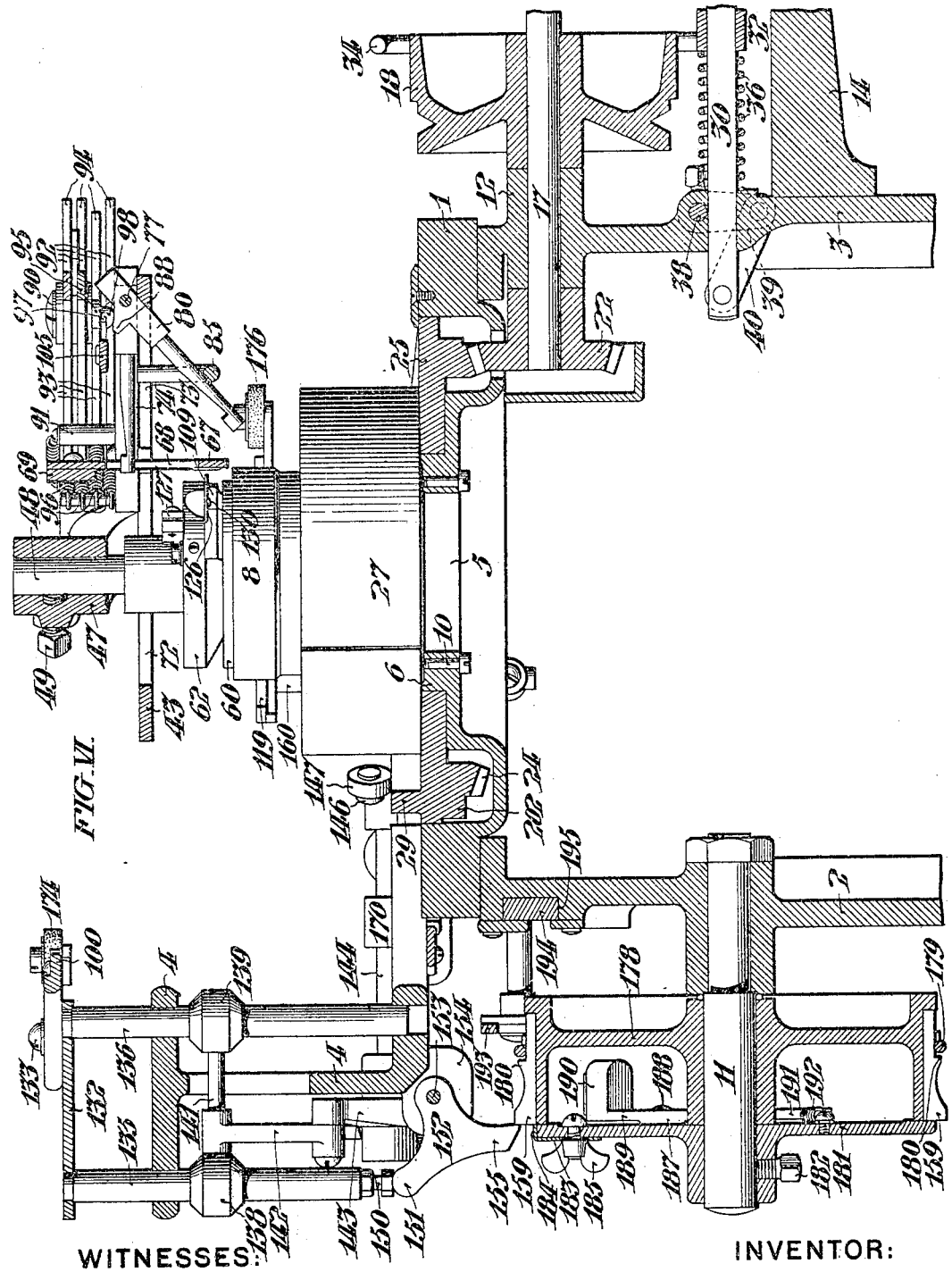

No. 798,792. PATENTED SEPT. 5, 1905.
E. A. HIRNER.
CIRCULAR KNITTING MACHINE.
APPLICATION FILED JULY 22, 1903.
8 SHEETS—SHEET 7.
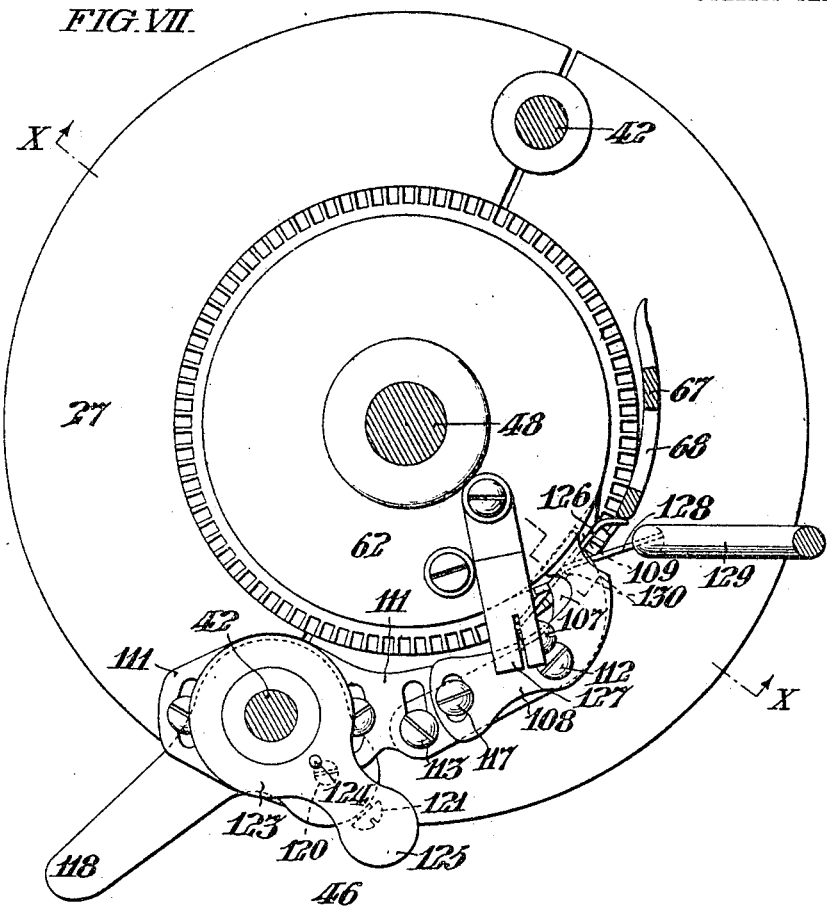
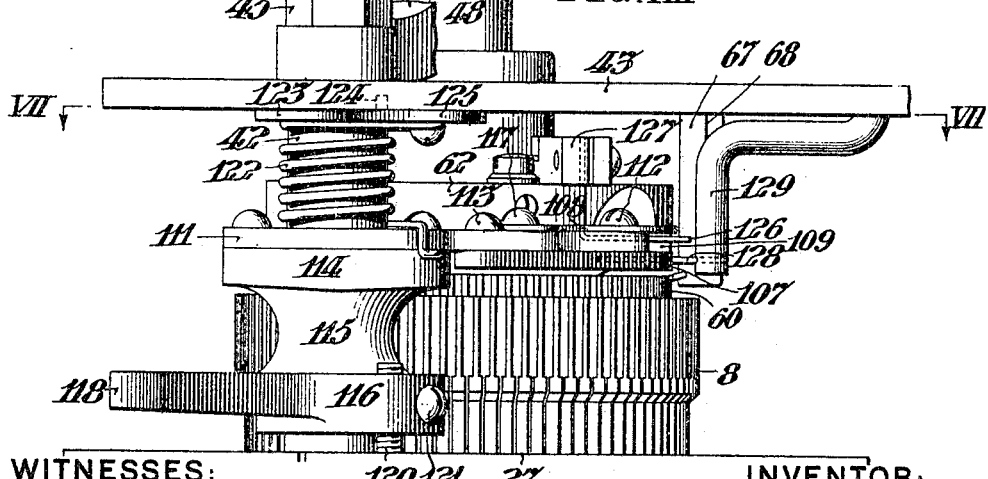
WITNESSES:  INVENTOR:

No. 798,792. PATENTED SEPT. 5, 1905.
E. A. HIRNER.
CIRCULAR KNITTING MACHINE.
APPLICATION FILED JULY 22, 1903.
8 SHEETS—SHEET 8.
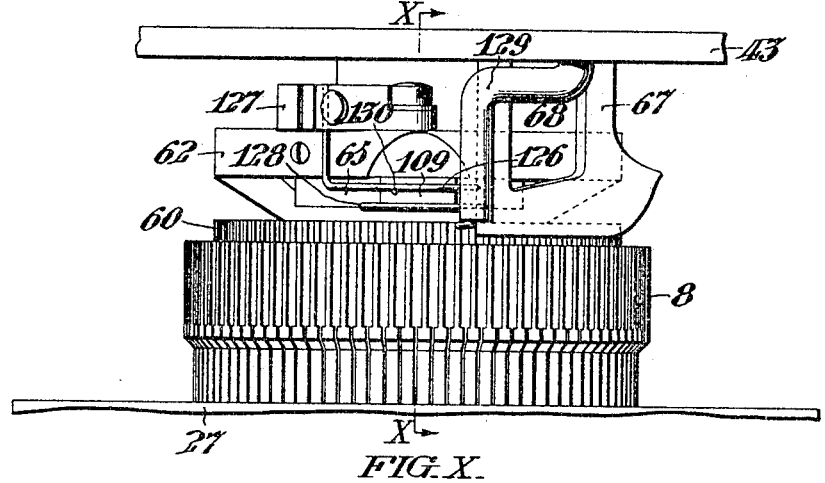
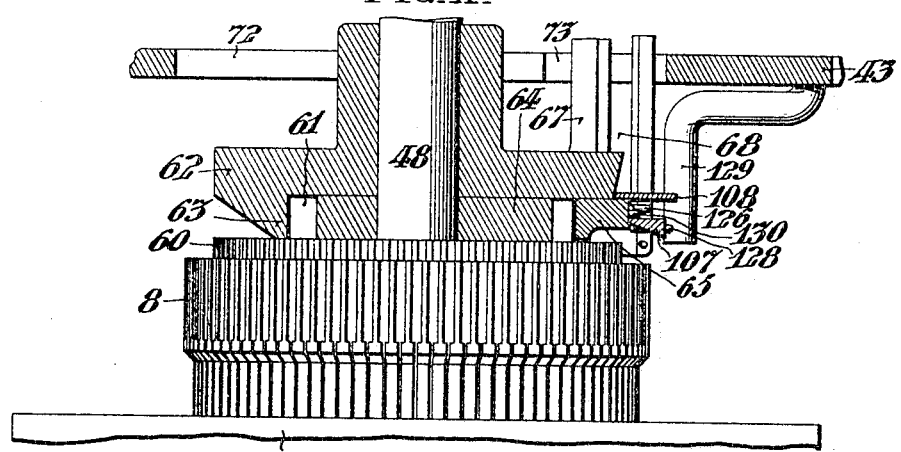
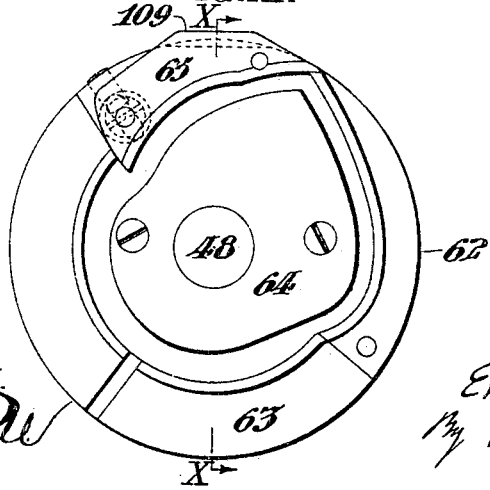
WITNESSES:
INVENTOR:

UNITED STATES PATENT OFFICE.

EMIL A. HIRNER, OF ALLENTOWN, PENNSYLVANIA.

CIRCULAR-KNITTING MACHINE.

No. 798,792.            Specification of Letters Patent.            Patented Sept. 5, 1905.

Application filed July 22, 1903. Serial No. 166,536.

*To all whom it may concern:*

Be it known that I, EMIL A. HIRNER, a citizen of the United States, residing at Allentown, in the county of Lehigh and State of Pennsylvania, have invented certain new and useful Improvements in Circular-Knitting Machines, whereof the following is a specification, reference being had to the accompanying drawings.

My invention relates to mechanism applicable to circular-knitting machines, whereby at predetermined intervals in the knitting operation the threads can be automatically changed—as, for instance, to produce horizontal colored stripes in hose. Certain parts of it are particularly applicable to rib-machines, and the entire mechanism is illustrated as thus applied; but other parts are capable of employment in connection with other ordinary forms of circular-knitting machines.

My invention comprises mechanism for effecting the changes of thread, related mechanism whereby said changes may be effected in accordance with a predetermined pattern, and mechanism coöperating with the foregoing whereby said threads are severed from the knitting and the ends of the threads which are out of use held under tension ready for use.

In the drawings and following description I have illustrated my invention as applied to a circular ribbed stocking-knitter of standard construction for the purpose of knitting multicolored hosiery having horizontal stripes; but I do not desire to limit my invention to such application, as it is obvious that it may be otherwise applied. I have used for illustration a machine controlling four threads; but it is obvious that any number may be conveniently used in practice.

In the accompanying drawings, Figure I is a plan view of a circular-rib-knitting machine embodying my invention. Fig. II is a front elevation of the same with its bobbin-carrier removed. Fig. III is a rear elevation with its bobbin-carrier removed. Fig. IV is a side elevation of said machine. Fig. V is a plan view, on a larger scale, with bobbin-carrier removed. Fig. VI is a central vertical section, certain of the parts being shown in elevation. Fig. VII is a plan sectional view taken on the line VII VII in Fig. VIII. Fig. VIII is an enlarged fragmentary side elevation of the needle-cylinder and thread-cutting mechanism as seen in Fig. II. Fig. IX is an enlarged fragmentary side elevation of the needle-cylinder, showing a face view of the anvil and thread-holding mechanism, the thread-cutting mechanism being removed. Fig. X is a fragmentary sectional view taken on the line X X in Figs. VII, IX, and XI, the needle-cylinder being shown in side elevation. Fig. XI is an inverted plan view of the cam-disk for operating the horizontal needles.

As shown in the drawings, the bed-plate 1 is supported upon standards 2 and 3 and supports the bracket 4, which is rigidly attached thereto at its left side. It is provided with a central aperture 5, (see Fig. VI,) surrounded by a flange 6, to which flange the needle-cylinder 8 is secured by the screws 10. The standard 2 is provided with a horizontally-projecting stud 11, upon which the pattern-drum is mounted to rotate. The standard 3 comprises a bearing 12 and a bracket 14, having a bearing 16 (see Fig. II) in alinement with the bearing 12, in which bearings the driving-shaft 17 is mounted to rotate with its tight and loose pulleys 18 and 19, respectively, mounted between said bearings 12 and 16. The hand-wheel 20 is secured to said shaft 17 at its outer extremity, and at its inner extremity said shaft is provided with the bevel-pinion 22, arranged to mesh with the circular rack 24, depending from the under side of the annulus 25, which is mounted to rotate within the bed-plate 1, and upon which the cam-cylinder 27 is mounted to rotate therewith. Said annulus 25 is provided with the cam-track 29, projecting from its upper surface.

A rectangular rod 30, upon which are adjustably mounted collars 32 and 33, having arms 34 projecting therefrom, forms a belt-shifter which engages a driving-belt. Said rod 30 is mounted to slide in alined guiding-apertures in the standard 3 and bracket 14. A spiral spring 36, surrounding the rod 30, is arranged to hold the arms 34 in registry with either the tight or loose pulley, the position being determined by a handle 37, fixed to a rock-shaft 38, on the other end of which is adjustably mounted a rocker-arm 39, which is connected by the link 40 to the inner end of rod 30. As shown on the drawings, the belt-shifter is in registry with the loose pulley 19; but when it is desired to shift it to register with the tight pulley 18 the handle 37 is thrown down to its vertical position, thereby rotating the arm 39 to a horizontal position, which is slightly past alinement with the link 40, as shown in dotted lines in Fig. III, and is held in said position by the outward pressure of spring 36.

Projecting upward vertically from the annulus 25 are two standards 42 42, supporting the plate 43, upon which is mounted the thread-changing mechanism. Resting on the plate 43 and engaging the upper ends of standards 42 by nuts 45 is a yoke 46, having a central hub 47, in which a standard 48 is held by a set-screw 49. Upon the upper part of the standard 48, which rotates with the annulus 25 above said yoke 46, is secured by set-screws the bobbin-carrier 50, (see Fig. IV,) through which are pierced the thread-guiding apertures 52, one for each of the bobbins, and also the collars 53 53 53, provided with similar thread-guiding apertures 54, and at the upper end of said standard 48 is a collar 55, from which four wire loops 56 radiate, forming the guide-eyes for the thread as it comes from the bobbins 58, which are mounted upon said carrier.

Rotatably mounted at the lower end of said standard 48 is the horizontal needle-disk or dial-plate 60, (see Fig. X,) which is prevented from rotating therewith by engagement with the vertical needle-cylinder 8. The needles carried by said needle-disk 60 are reciprocated radially by the groove 61, formed in the cam-disk 62 by the fixed peripheral cam 63, fixed central cam 64, and adjustable peripheral cam 65, said cam-disk 62 being fixed to the standard 48 above the needle-disk 60. Both the needle-disk 60 and cam-disk 63 may be vertically adjusted by the milled-edge thumb-nut 66, (see Fig. II,) which is in threaded engagement with the standard 48 and rests upon the upper surface of the hub 47 of the yoke 46.

A thread-carrier comprising a plate 67, (see Figs. II and IX,) having an elongated aperture 68, whose bottom edge is inclined rearwardly, so as to feed the thread to the needles at its lower rearward corner, is supported by the bracket 69, which is secured to the upper surface of the plate 43 by screws 70. The plate 43 is provided with a central circular aperture 72, (see Fig. V,) slightly larger than the needle-cylinder, and a smaller aperture 73, cutting into it at one side of the central aperture.

A pair of parallel bars 74 bridge the aperture 73 and are secured to the plate 43 by screws 75. Said bars support the ends of a pivot-bar 77, which is secured therein by set-screws 78, and upon which bar 77 are pivoted four thread-changers 80. They are of equal length and each consists of a pivoted lever having its swinging end turned up and pierced by a thread-eye 81, while their pivoted ends are rectangular in cross-section, thereby insuring accurate alinement in their swinging motion. As shown in Fig. V, their free ends, carrying the thread-eyes 81, are bent together, so that they all lay their threads as near to the lower corner of the aperture of the thread-carrier 67 as possible.

A depending wire yoke 85 has its vertical ends adjustably secured in the bars 74 by set-screws 86. Its horizontal portion serves as a stop to limit the downward motion of the thread-changers 80, as best shown in Fig. VI, said level being such as to permit the eye of the thread-changer to fall slightly below the thread-carrier.

The upper side of each thread-changer is provided with an upwardly-projecting boss 88, slightly forward of its pivot, having its side adjacent to said pivot beveled rearwardly.

An upright post 90, (see Fig. V,) projecting up from the plate 43, has pivoted thereon four horizontal cam-actuated levers 92, one above the other. Each of these levers has three arms—a long arm 93, a cam-arm 94, and a short arm 95. The levers are normally held under tension of the springs 96, one for each lever, with their long arms resting against a stop-pin 91, projecting from the plate 43. These levers are similar with exception of their short arms 95, which decrease in length from the uppermost lever to the lowermost one, so that their extremities register successively with the pivotal ends of their corresponding thread-changers 80. Each of the arms 95, except the lowest one, is provided with a depending post 97, terminating in a shoe 98, which post is of sufficient length to permit said shoe to reach to the top of the squared end of its corresponding thread-changer behind its pivot. The lowest arm 95 is located in direct contact with its thread-changer. Therefore no post or shoe is provided.

The movement of the levers 92 to the limits of their motion causes the arm 95 with its shoe to ride over the top of its respective thread-changer from one side to the other of its pivot 77, so that when the arm 95 is in its outer position its thread-changer is held in its normal horizontal position by the pressure of the shoe 98, and when said arm 95 is moved against the tension of its spring into its inner position its thread-changer is depressed by the said shoe 98 coming into contact with the beveled boss 88, projecting from said thread-changer. Thus the oscillation of any of the levers raises or depresses its corresponding thread-changer.

The motion of the levers 92 to depress their thread-changers is caused by their contact with a vertically-movable cam-plate 100 (see Fig. VI) as they are carried around by the plate 43, thereby laying their respective threads into the thread-carrier to be fed to the needles.

To prevent the knitting of more than one thread at a time, it is necessary that the depression of any one of the thread-changers should simultaneously raise any other one that has been previously depressed, and this is effected by a trigger 101, (see Fig. V,) pivoted upon the upright post 102, projecting up from the plate 43. Said trigger is normally held against a stop-pin 103 by the tension of a spring 104. Its free end is blunt, while its side surface is beveled outward adjacent to said free end. When the cam-plate 100 is moved into the path of any one of the levers 92 to depress its respective thread-changer, the long arm 93 of said lever 92 comes into contact with the beveled surface of the trigger 101, pushing it out against the tension of its spring 104 until said arm 93 has cleared said trigger, which thereupon returns to its normal position, in which its blunt end holds the lever 92 in opposition to its respective spring 96 until the trigger 101 is again oscillated. When by reason of the cam-plate 100 assuming a different vertical position another of the levers 92 is moved to depress its thread-changer, its long arm 93 in passing the trigger swings it out until the lever last actuated is released and returned by its respective spring 96 to the position in which its thread-changer is raised out of action. Thus the same motion of any one of the arms 93 which sets the lever 92 in position to depress its thread-changer releases any lever which has previously been so set.

A thread-guide plate 105 (see Fig. V) extends transversely between the bars 74 74 over the thread-changers in close proximity thereto and is provided with thread-apertures 106, adapted to lead the thread to the thread-eyes 81.

The thread is severed as it is removed from action by a hammer 107, (see Fig. VII,) whose striking edge takes the form of a blunt knife and is arranged to deliver a swinging blow upon the thread (which is drawn taut by a clamp 108) across the flattened outer surface 109 of the cam 65, which thus serves as an anvil. Said hammer 107 is adjustably secured to the under side of a horizontal swinging arm 111 by set-screws 112 and 113, (see Fig. VIII,) which arm is adjustably secured to the top flange 114 of a sleeve 115, pivotally mounted upon one of the standards 42. A bottom flange 116, provided with a projecting cam-arm 118, is adapted to be engaged by a cam-plate 119. Through said flange 116 extends a vertical set-screw 120, held in fixed relation thereto by the set-screw 121. The lower end of screw 120 bears upon the upper surface of the cam-cylinder 27, and thus the sleeve 115, with all its extensions, may be vertically adjusted. The clamp 108 is adjustably secured to the upper side of the swinging arm 111 by set-screws 112 and 117, and is adjusted to such a plane (by the set-screw 120) that it will swing in sliding contact over the top surface of the cam 65 immediately above the anvil 109, and thereby draw the thread taut across the face of said anvil to be struck by the hammer 107. The clamp 108 and hammer 107 are normally pressed toward said anvil by a spiral spring 122, surrounding the standard 42. The upper end of this spring is attached to a plate 123, loosely surrounding said standard and having a projecting pin 124, adapted to engage when in registry therewith an aperture in the under side of the plate 43. The lower end of said spring is bent to engage the arm 111, as best shown in Fig. VIII.

By pressing on the finger-piece 125 of the plate 123 pin 124 may be disengaged, thereby releasing the tension of the spring 122, so that the clamp 108 and hammer 107, carried by the arm 111, may be maintained out of contact with the anvil 109. Spring thread-clips 125 and 128 (see Figs. VII, VIII, IX, and X) press against the face of the anvil 109 respectively above and below the hammer 107. The clip 126 is adjustably suspended from a bracket 127, secured to the top of the cam-disk 62. It passes first down and then horizontally along the anvil just above the level of the hammer. It has its free forward end bent outwardly to guide the thread into contact with the face of the anvil as it is thrown out of use and there retain its loose end after being severed until it is again brought into use by its respective thread-changer. The clip 128 projects horizontally from the end of a bent post 129, depending from one of the bars 74. It passes horizontally along the anvil just below the level of the hammer. It serves to hold the thread while being severed by the hammer 107. The registry of said thread with the hammer is insured by a stop-pin 130, projecting from the anvil above said hammer.

Both the cam-plates 100 and 119 (see Fig. VI) are normally inoperative by reason of their being held above the planes in which their respective cam-arms revolve. It will be noted that each time the cam 100 is to be lowered into the path of any one of the cam-arms 94 to change a thread the hammer must also be operated to sever the thread which has just been thrown out of use. Consequently the vertical reciprocation of the cam-plates 100 and 119 are conveniently derived from the same mechanism.

The cam-plate 100 is adjustably secured to the top surface of a supporting-plate 132 by set-screws 133, which plate 132 is set upon the upper ends of two rods 135 and 136, which are guided for vertical reciprocation in the bracket 4 and provided with adjustable collars 138 and 139, clamped thereto by set-screws 140. A horizontal pin 141, connecting said collars, is connected by a link 142 to the free end of a rocker-arm 143, fixed to one end of a rock-shaft 144, journaled for reciprocation in the bracket 4. On the opposite end of said rock-shaft is fixed a rocker-arm 146, carrying at its free end a roller 147, adapted to rest upon the cam-track 29 as it runs beneath it.

The rod 135 is provided at its lower end with an adjusting-screw 150, which rests upon the upper arm 151 of a bell-crank lever 152, pivoted at 153, between lugs 154, integral with said bracket 4. Thus the rod 135 is governed in its downward motion by the lower arm 155 of this bell-crank lever engaging the ends of jacks 159 set in slots around the periphery of a pattern-drum 178. The jacks are of various lengths to permit the cam 100 to be lowered into the paths of the different thread-changing levers.

The bell-crank lever 152 is oscillated upon its pivot 153 by the reciprocation of rod 135, being held in contact therewith by a spiral spring 157, attached at one end to the arm 151 and at its opposite end to the collar 138.

A spiral spring 158, against the tension of which the entire cam-carrying mechanism is held by the jacks 159, is attached at its upper end to the supporting-plate 132 and at its lower end to the bracket 4.

The cam-plate 119 (see Fig. III) is fixed to the upper end of rods 160 and 161, which are guided for vertical reciprocation in sockets 162, attached to the bed-plate 1. The rod 160 extends below the bed-plate and is connected by a link 164 with the arm 165 of a lever 166, pivoted centrally at 167. The opposite arm 168 of said lever extends beneath and is adapted to be depressed by a rocker-arm 170, secured to the rock-shaft 144.

As cam-plate 119 differs from cam-plate 100 in that its working level is constant it is stopped in its descent as soon as it reaches the plane of the cam-arm 118 by contact with the top of the sockets 162, which are preferably so proportioned as to permit the use of a spacing-washer 171, surrounding the rod 161, which provides an adjustable limit to the downward motion of the cam-plate.

Oiling-rollers 174 and 176 are respectively attached to the forward end of the cams 100 and 119, so as to contact with their respective lever-arms.

The pattern mechanism comprises a hollow drum 178, (see Fig. VI,) mounted for rotation upon the horizontal stud 11, and is provided with a series of slots in its periphery parallel to its axis in which are inserted jacks 159, which are of various lengths to determine the pattern. There are five lengths used in the machine illustrated, four of which serve to permit the lowering of the cam-plate 100 into the path of one or other of the four thread-changing levers 92, while the fifth serves to hold said cam-plate 100 above the path of any of said lever-arms until it is again desired to change the thread, when another of the four shorter jacks will be presented in the plane of the arm 155 of the bell-crank lever 152 by the rotation of said drum 178. Thus the short jacks change the thread, while the number of long jacks following any short jack determine the number of courses to be knit of that color thread without change.

The jacks 159 are held in their respective slots by the coöperation of a split ring 179, surrounding said drum and jacks adjacent to their shoulders 180, and a circular plate 181, fixed to the stud 11 by a set-screw 182, which plate by slightly overlapping their ends prevents their displacement parallel to the axis of said drum.

A triangular-shaped plate 183, (see Figs. IV and VI,) having a flange 184, is adapted to overlap a flattened portion on the periphery of said plate 181, to which plate it is engaged by the wing-nut 185. By the removal of said triangular plate 183 the jacks may be changed without disturbing the large circular plate 181. A lever 187 is pivoted to the plate 181 at 188, whose one arm 189 terminates in a friction-shoe 190, pressed against the inner periphery of the drum 178 by the tension of a spring 192, attached at one end to the arm 191 of said lever 187 and at the other end to the plate 181. The friction-brake thus formed prevents the drum 178 from overrunning the distance between adjacent jacks as it is rotated step by step by a pawl 193, engaging the rear ends of said jacks, which coöperate therewith as ratchet-teeth.

The pawl 193 (see Fig. II) is pivoted to a reciprocating bar 194, mounted to slide in guides 195, formed in the standard 2 adjacent to the bed-plate 1. This bar is reciprocated by a lever 196, pivoted at one end beneath the bed-plate 1, while its opposite end is bifurcated and engages a pin 186, mounted in a block 197, which is adjustably connected to the bar 194 by an adjusting-screw 198, passing through said block and bearing against the end of said bar. The block 197 is clamped in its adjusted position by a set-screw 199. The lever 196 is oscillated by means of a shoe 200, pivoted thereto and held by a spring 201 in sliding engagement with an eccentric 202, formed on the circular rack 24. As the bar 194 is thus reciprocated the free end of the pawl 193 rides upon a pin 204, (see Fig. IV,) secured to the standard 2, until said pin enters a recess 205 in said pawl, which permits the engagement of the pawl with the ratchet-teeth, formed by the jacks 159, thereby giving rotary motion to the drum 178 to the extent of the distance between jacks once for each reciprocation of the bar 194.

A tapered pin 208 extends beneath the free end of pawl 193, depending from a hand-lever 209, pivoted to the bed-plate at 210. In the event of the operator desiring the thread-changing mechanism to cease operating under the control of the pattern-drum the free end of lever 209 is moved outward, thereby engaging the free end of the pawl 193 with the thicker portion of the pin 208 and raising said pawl out of engagement with the teeth formed by the jacks in said drum 178, so that the pattern-drum ceases to rotate.

The operation is as follows: The threads are passed from their bobbins 58 through their respective thread-guiding loops 56, apertures 54 52 106, and eyes 81, thence through the thread-carrier apertures 68 to the spring-clip 126, by which their ends are engaged. The pattern-drum 178 is set so that the next thread-changing jack to be engaged by the bell-crank lever 152 will permit the cam-plate 100 to be lowered to the proper plane to engage one of the levers 92 and depress its thread-changer 80, carrying the thread which is desired to start the knitting. By rotation of the machine the cam-track 29 engages the roller 147, which disengages the bell-crank lever 152 from the ends of the jacks a sufficient period to permit the drum 178 to be pawled around the distance of one jack by the engagement of the shoe 200 with the eccentric 202. If the jack just presented in the plane of the bell-crank lever 152 is a thread-changing jack, said lever will be oscillated as the roller 147 descends the rear incline of the cam-track 29 until it engages said jack, and thereby lowers the cam-plate 100 into the path of the desired thread-changing lever 92, which is carried around by the rotation of the machine and whose cam-arm 94 is pressed by said cam 100 far enough to trip the trigger 101 by the long arm 93 and be held thereby until the cam-plate is lowered to the plane of another of said levers 92. The short arm 95 of the thread-changing lever thus operated depresses its thread-changer 80, so as to lay its thread in the lower rear corner of the aperture 68 of the thread-carrier. This places the thread between the needles, causing it to knit for as many courses as there are long jacks following the last thread-changing jack in the pattern-drum until another thread-changing jack is encountered by the bell-crank lever 152. This permits the cam-plate 100 to be again lowered to the plane of another of the levers 92, where it engages the cam-arm 94, rotating said lever until its long arm 93 trips the trigger 101, thereby releasing the lever already engaged and being itself engaged by said trigger. Thus the thread corresponding to the last-mentioned lever is lowered to be caught by the needles, while at the same time the thread corresponding to the previously-operated lever is raised and held by the fabric at the last needle to which it was fed until by rotation of the machine it is guided and held across the face of the anvil 109. Thereupon the cam-plate 119, having been lowered simultaneously with the cam-plate 100 and by the same mechanism, engages the cam-arm 118, thereby rotating the sleeve 115, with its arm 111, swinging the hammer 107 and clamp 108 to its outer position. The further rotation of the machine releases the cam-arm 118, and said hammer and clamp are driven back by the spring 122 with considerable force. The clamp being slightly in advance of the hammer presses the thread over the edge of the anvil and draws it taut as the hammer delivers its blow upon said thread, thereby severing it and permitting the lower portion, which is fast to the fabric, to be drawn from under the clip 128, thereby clearing said clip to receive the next thread to be severed, while the remaining portion of the thread which passes through the thread-changer is held by the clip 126 in readiness to be again thrown into operation by its thread-changer. All the idle threads are thus held in readiness for use.

It will be observed that during those rotations of the machine which occur while the bell-crank lever 152 is resting against one of the full jacks 159 the cam-plate 119 is restrained from descending far enough to come into engagement with the cam-arm 118, thus preventing any action of the hammer 107, except when a thread is being changed. By thus putting the thread-severing mechanism under the control of the same pattern-drum which operates the thread-changers the machine is rendered less noisy and is subjected to less wear than in those constructions in which the thread-severing mechanism operates at each rotation of the machine irrespective of whether there is a thread to be severed at that time or not.

It will be noted that reference has frequently been made to the devices by which most of the parts involved in the mechanism thus described are rendered adjustable. Such devices are highly important in mechanism of this description, as readjustment is frequently necessary not only to take up wear, but to meet the varying conditions under which the machine must be operated.

Having thus described my invention, I claim—

1. In a circular-rib-knitting machine, the combination of needle-cylinder and needle-disk; cam-cylinder and cam-disk; standards and yoke mounted upon the cam-cylinder and supporting the two disks; an annular plate supported upon said standards above the level of the disks; the aperture of said plate exceeding the diameter of the needle-cylinder; there being a smaller eccentric opening in said annular plate; thread-changing levers mounted over said smaller opening and capable of vertical motion therethrough in order that the depression of any one of the levers through said opening may introduce its thread into the knitting operation.

2. In a circular-rib-knitting machine, the combination of needle-cylinder and needle-disk; cam-cylinder and cam-disk; standards and yoke mounted upon the cam-cylinder and supporting the two disks; an annular plate supported upon said standards above the level of the disks; the aperture of said plate exceeding the diameter of the needle-cylinder; a thread-carrier provided with an elongated aperture, the bottom edge of which is rearwardly inclined, said thread-carrier depending from the inner edge of said annular plate; and a series of vertically-movable thread-changing levers mounted upon said plate in proximity to the thread-carrier, and which by placing their thread at the bottom of said carrier introduce into the knitting operation.

3. In a circular-rib-knitting machine, the combination of needle-cylinder and needle-disk; cam-cylinder and cam-disk; a plurality of thread-changing levers mounted in fixed relation to said cam-disk and swinging from a position in which the free end is above the plane of said cam-disk to a position in which the free end is below the plane of said cam-disk; a thread-carrier also mounted in fixed relation to said cam-disk between said disk and the free ends of said levers; and thread-clamping and thread-severing devices mounted upon said cam-disk.

4. The thread-severing mechanism for a rib-knitting machine which consists of a cam-disk; an anvil upon the edge of said cam-disk; two horizontal thread-clips for holding thread ends against the surface of the anvil; said thread-clips being respectively supported at opposite ends; and a horizontally-swinging hammer pivoted in relation to the said thread-clips to deliver its blow upon the anvil between said thread-clips.

5. The thread-severing mechanism for a rib-knitting machine which consists of a cam-disk; an anvil upon the edge of said cam-disk; a horizontally-swinging hammer delivering a blow upon said anvil; thread-clips for guiding and holding thread ends on the surface of the anvil; and a stop-pin projecting from said anvil in proximity to the place where the hammer delivers its blow.

6. In a circular-rib-knitting machine, the combination of needle-cylinder and needle-disk; cam-cylinder and cam-disk; thread-changing levers mounted in fixed relation to the cam-disk and moving vertically in proximity to its periphery; an anvil formed upon the periphery of the cam-disk; a stop by which the thread which is drawn from the knitting by the elevation of a thread-changing lever is held on the anvil preparatory to the severing operation; and a thread-severing hammer delivering its blow upon said anvil against the thread which is held there by said stop.

7. In a circular-rib-knitting machine, the combination of needle-cylinder and needle-disk; cam-cylinder and cam-disk; thread-changing levers mounted in fixed relation to said cam-disk, the swinging ends of which move vertically in proximity to the periphery of the cam-disk; an anvil upon the periphery of said cam-disk; a horizontal thread-clip crossing the anvil, the fixed end being away from and the free end directed toward the thread-changing levers; and a horizontally-swinging hammer delivering a blow upon the anvil immediately below said horizontal thread-clip.

8. In a circular-rib-knitting machine, the combination of needle-cylinder and needle-disk; cam-cylinder and cam-disk; thread-changing levers mounted in fixed relation to said cam-disk, the swinging ends of which move vertically in proximity to the periphery of the cam-disk; an anvil upon the periphery of said cam-disk; a horizontal thread-clip crossing the anvil, the fixed end being next to and the free end directed away from the thread-changing levers; and a horizontally-swinging hammer delivering a blow upon the anvil immediately above said horizontal thread-clip.

9. In a circular-rib-knitting machine, the combination of needle-cylinder and needle-disk; cam-cylinder and cam-disk; thread-changing mechanism; an anvil formed on the edge of the cam-disk in position to be traversed by a thread as it is drawn out after withdrawal from the needles by one of the thread-changers; a vertical standard mounted upon the cam-cylinder; a swinging arm pivoted upon said standard and carrying a hammer in position to deliver a blow upon said anvil; a spring normally pressing said hammer toward said anvil; a cam-arm connected to said swinging arm by means of which motion in the contrary direction is imparted against the tension of the spring; and a screw by means of which the vertical position of the swinging arm upon the standard may be adjusted in order to vary the height at which the blow of the hammer on the anvil shall be struck.

10. In a circular-knitting machine fitted with automatic thread-changing mechanism; thread-cutting mechanism comprising an anvil having two surfaces substantially at right angles to each other; a pivoted arm yieldingly pressed against said anvil and carrying two members, one coöperating with one of said surfaces of the anvil to draw the thread taut and the other coöperating with other surface to sever the thread; and automatic means to operate said thread-changing mechanism and said thread-cutting mechanism at predetermined intervals.

11. The thread-severing mechanism for circular-rib-knitting machines, which consists of an anvil upon the outer edge of the cam-disk; said anvil having a flattened outer surface and also a flattened top surface; means for holding thread ends against the flattened outer surface of the anvil; a pivoted arm carrying a thread-severing end by the impact of which the thread lying against the outer surface of the anvil is severed; and a thread-clamp which is also fast to the pivoted arm which carries the thread-severing device, and which, as the latter comes in contact with the outer surface of the anvil, slides over the flattened top surface of the same, thereby imparting an additional tension to the threads at the time of their severance.

12. The thread-severing mechanism for circular-rib-knitting machines, which consists of an anvil upon the outer edge of the cam-disk; said anvil having a flattened outer surface and also a flattened top surface; means for holding thread ends against the flattened outer surface of the anvil; a pivoted arm carrying a thread-severing end by the impact of which the thread lying against the outer surface of the anvil is severed; a thread-clamp which is also fast to the pivoted arm which carries the thread-severing device, and which, as the latter comes in contact with the outer surface of the anvil, slides over the flattened top surface of the same, thereby imparting an additional tension to the threads at the time of their severance; in combination with means for effecting the vertical adjustment of said pivoted arm whereby the contact between said clamping device and the flat top surface of the anvil may be regulated.

13. In a circular-knitting machine, the combination of a plurality of thread-changers rotating with the cam-cylinder; a similar plurality of levers superimposed one upon the other by which the thread-changers are actuated; a radially-fixed but vertically-adjustable cam interposed by its vertical adjustment into the path of one or other of said superimposed levers; a pattern-wheel rotating in a vertical plane with pattern-jacks of varying lengths set in radial slots around its periphery; and a bell-crank lever, the motion of which is limited by the contact of one of its arms with the said jacks, and the other arm of which in turn limits the vertical position of the cam by which the thread-changers are actuated.

14. In a circular-knitting machine, the combination of thread-changing devices for controlling a plurality of threads, and thread-severing devices rotating with the cam-cylinder; a radially-fixed cam by the vertical adjustment of which the thread-severing devices are actuated; another radially-fixed cam by the vertical adjustment of which the thread-changing devices are actuated; means for reciprocating both said vertically-adjustable cams once for each rotation of the cam-cylinder; a single pattern device by which the descent of both cams may be simultaneously limited so as to keep them inactive; and a fixed stop forming a limit for the further descent of the cam which controls the thread-severing devices, whereby it is compelled to assume its single active position every time that the cam which actuates the thread-changing devices assumes any one of its active positions, irrespective of the extent of the descent of said latter cam, and consequently irrespective of which one of the plurality of thread-changers is actuated by it.

15. In a circular-knitting machine, having automatic thread-changers; a movable cam-plate adapted to be positioned to operate any one of said changers; pattern mechanism to control the position of said cam-plate, comprising a drum, carrying a series of jacks on its periphery, arranged to be intermittently rotated by a pawl, coöperating with the said jacks as ratchet-teeth; means to reciprocate said pawl once for each rotation of the knitting-machine; and means to lift said pawl out of coöperation with said jacks, without interference with its reciprocation.

16. The combination with the cylinders of a circular-knitting machine; of a rotatable frame concentric with said cylinders; thread-severing mechanism comprising a pivoted thread-severing lever rotating with said frame; thread-changing mechanism comprising a set of superimposed pivoted levers mounted on said frame; non-rotatable cam-plates with capacity for vertical adjustment adapted to operate said mechanisms; means to normally retain said cam-plates in inoperative position; and means whereby, at predetermined intervals, the cam-plate for the thread-cutting mechanism is placed in position to actuate said mechanism, and at the same time the cam-plate for the thread-changing mechanism is placed in position to coact with one of said set of superimposed levers.

17. The combination with the cylinders of a circular-knitting machine; of a rotatable frame concentric with said cylinders; means for rotating said frame; thread-severing mechanism rotating with said frame; thread-changing mechanism comprising a set of superimposed pivoted levers so mounted on said frame; a cam-plate interposable within the path of any one of said thread-changing levers, but normally retained in inoperative position; pattern mechanism interposing said cam-plate at intervals in the path of one of said thread-changing levers; a second cam-plate vertically adjustable to coact with said thread-severing mechanism; and connections between said cam-plates whereby whenever said first-mentioned cam-plate is positioned to coact with any one of said thread-changing levers, said second-mentioned cam-plate is adjusted vertically to come in contact with said thread-severing mechanism.

18. The combination with the cylinders of a circular-knitting machine; of a rotatable frame concentric with said cylinders; thread-changing mechanism rotating therewith comprising a set of superimposed pivoted levers; a non-rotating vertically-adjustable cam-plate to operate said mechanism; means for adjusting said cam-plate, comprising a pattern-drum; means to angularly progress said wheel a fraction of a rotation for each complete rotation of said frame, connections supporting said cam-plate normally in contact with said pattern-drum; a circular cam-track surrounding the base of the cam-cylinder; connections between said track and said cam-plate whereby said cam-plate-supporting connections are raised out of contact with said pattern-drum once in every complete rotation of said frame, and held out of contact therewith while said drum is angularly progressed.

19. The combination with the cylinders of a circular-knitting machine; rotating thread-changing mechanism; a non-rotating adjustable cam-plate to operate said mechanism; means to adjust said cam-plate comprising a vertical pattern-drum having slots in its periphery adapted to receive pattern-jacks; means to angularly progress said wheel the distance between adjacent jacks for each complete rotation of said frame; a bell-crank lever pivoted to said frame and normally in contact with said jacks; supporting means for said cam-plate resting on said bell-crank lever; a circular cam-track carried by said frame; connections between said track and said cam-plate-supporting means; comprising a rock-shaft having on one end an arm carrying a roller in engagement with said cam-track, and at the other end an arm connected by a link to said supporting means, whereby the supporting means is brought into contact with said jacks once in every rotation of said frame and thrown out of contact therewith while the wheel is angulary progressed.

20. The combination with the cylinders of a circular-knitting machine; rotating thread-changing mechanism, comprising a set of superimposed pivoted levers; rotating thread-severing mechanism comprising one pivoted lever; non-rotating adjustable cam-plates to operate said mechanism; means to adjust said cam-plates comprising a pattern-drum having a series of jacks removably secured thereto; a bell-crank lever normally bearing against the ends of said jacks; the cam-plate which controls the thread-changing mechanism having its supporting means resting on said bell-crank lever; connections from said supporting means to a rock-shaft; connections from said rock-shaft to the supporting means of the cam-plate which controls the thread-severing mechanism; a circular cam-track rotating with the cam-cylinder; and an arm on said rock-shaft carrying a roller in position to be acted on by said cam-track, whereby said bell-crank lever will be raised out of contact with said jacks once in every rotation of said frame while the pattern-drum is angularly progressed.

21. In a circular-knitting machine, having automatic thread-changers, a movable cam-plate adapted to be positioned to operate any one of said changers; pattern mechanism to control the position of said cam-plate comprising a pattern-drum journaled on a stud-shaft, with its axis at right angles to the path of movement of said cam-plate; said drum having a series of slots in its periphery parallel to its axis; a series of pattern-jacks of different lengths in said slots; means to intermittently rotate said wheel; a bell-crank lever arranged to engage the end of one of said jacks; means bearing against said bell-crank lever arranged to support said cam-plate; and means to hold said bell-crank lever away from said jacks during the rotation of said wheel.

In witness whereof I have signed my name to this specification, this 10th day of July, A. D. 1903, in the presence of two subscribing witnesses.

EMIL A. HIRNER.

Witnesses:
EDWARD RUHE,
EDGAR C. NAGLE